United States Patent [19]

Morgan et al.

[11] 4,369,135
[45] Jan. 18, 1983

[54] ADHESIVE COMPOSITIONS

[75] Inventors: Albert W. Morgan, Collinsville, Ill.;
Roland G. Ribaudo, St. Louis, Mo.

[73] Assignee: Monsanto Company, St. Louis, Mo.

[21] Appl. No.: 213,776

[22] Filed: Dec. 8, 1980

Related U.S. Application Data

[63] Continuation-in-part of Ser. No. 47,426, Jun. 11, 1979, abandoned.

[51] Int. Cl.³ .................. C08F 8/30; C08L 33/00; C09D 3/74
[52] U.S. Cl. ................. 524/294; 524/549; 525/327.5
[58] Field of Search ............ 260/30.8 R, 31.8 G, 260/30.6 R

[56] References Cited

U.S. PATENT DOCUMENTS

| | | | |
|---|---|---|---|
| 3,036,977 | 5/1962 | Koch et al. | 260/29.6 |
| 3,400,152 | 9/1968 | Block et al. | 260/30.8 |
| 3,419,641 | 12/1968 | Peterkin et al. | 260/30.8 R |
| 3,733,292 | 5/1973 | Sirotu et al. | 260/29.6 |
| 3,971,744 | 7/1976 | Hudecek et al. | 260/31.8 G |
| 4,073,756 | 2/1978 | Yotsuyonogi | 260/18 N |
| 4,130,213 | 12/1978 | Wszolek | 260/30.8 R |

*Primary Examiner*—William F. Hamrock
*Assistant Examiner*—Peter F. Kulkosky
*Attorney, Agent, or Firm*—G. R. Beck; W. H. Duffey

[57] ABSTRACT

Adhesive compositions providing high bond strength, long shelf life, desirable flow characteristics and end use versatility are prepared by mixing a copolymer of olefinic monomers including maleic anhydride and/or derivatives thereof, plasticizer and at least one monofunctional compound which reacts with the copolymer to render it soluble in the resulting mixture and substantially soluble in the plasticizer. Water based, hot melt and pressure sensitive embodiments of such compositions are included.

21 Claims, No Drawings

ADHESIVE COMPOSITIONS

REFERENCE TO RELATED APPLICATION

This application is a continuation-in-part of our co-pending application Ser. No. 47,426 filed June 11, 1979, now abandoned.

BACKGROUND OF THE INVENTION

The search for new adhesives having improved performance characteristics, including particularly higher bond strength, is never-ending. Another important pursuit is the discovery of new adhesives which do not require use of an organic solvent such as those employed in typical contact cements, e.g., toluene, xylene, benzene, heptane and chlorinated hydrocarbons, which present problems of atmospheric pollution, safety (e.g. flammability) and recovery costs in commercial uses.

Some adhesive studies have investigated combinations of copolymers of maleic anhydride and/or maleic acid and a plasticizer. However, such normally solid copolymers have commonly required heating to at least their melting points (generally from about 150° to about 250° C.) to render them soluble in the plasticizer, e.g. as disclosed in U.S. Pat. No. 4,077,935 issued Mar. 7, 1978 to W. R. Wszolek. Major disadvantages of the need for such high temperatures include higher energy requirements and unsuitability for home use or economical water-based adhesive systems.

Accordingly, there is a need for improved adhesive compositions which do not require the use of such high temperatures, and it is an object of this invention to provide such compositions. Another object is new adhesive compositions which do not require the use of organic solvents. Another object is a broad class of new adhesives characterized by unusually high bond strengths. Other objects include adhesive compositions having long shelf life, end use versatility and other desirable characteristics including convenient open times, degree of tack, etc. These and other objects of the invention will be more apparent from the following disclosure and claims in which all parts and percentages are by weight except where noted otherwise.

SUMMARY OF THE INVENTION

In accordance with this invention, the foregoing objects are achieved and novel, attractive adhesive compositions are prepared by mixing (A) plasticizer, (B) normally-solid copolymer of olefinically unsaturated monomers of which a substantial proportion are maleic monomers selected from maleic anhydride, derivatives thereof such as, e.g. maleic acid, maleic acid esters, etc. and combinations thereof and (C) compatibilizer selected from monofunctional compounds which react with at least a portion of the maleic monomers in the copolymer to render the copolymer soluble (usually essentially completely) in the resulting composition and substantially soluble in the plasticizer component of the mixture at a temperature below the melting point of the copolymer. Variations of such compositions are conveniently useful as water based, hot melt and/or pressure sensitive adhesives which do not require organic solvents and in many embodiments, provide surprisingly high bond strength.

DETAILED DESCRIPTION OF THE INVENTION

As used herein, the term "copolymer of olefinically unsaturated monomers" refers to polymers of monomers which polymerize by addition through olefinic bonds, e.g. ethylene, propylene, the butylenes, butadiene, vinyl chloride, vinyl acetate, vinyl propionate, methyl acrylate, methyl methacrylate, the maleic monomers referred to herein, etc. Copolymers of that kind which are used in this invention are normally solid, preferably have a number average molecular weight (MW) between about 5,000 and about 100,000, and are typically employed in a finely divided form, e.g. as particles at least about 90% of which have a major diameter smaller than about 100 microns. Such copolymers contain maleic monomers in substantial proportion, preferably between about 30 and about 70 mole percent, although lower or higher mole percentages may be satisfactory in some instances. Even more preferred in many embodiments are copolymers containing from about 40 to about 60 mole percent maleic monomers. On a weight basis the maleic monomers constitute generally between about 25% and about 75%, preferably between about 30% and about 70%, and usually even more advantageously between about 35% and about 65% of such copolymers. Preferably the remainder of the unsaturated monomers (the non-maleic monomers) in the copolymer are essentially unreactive with the compatibilizer used in this invention, although such reactivity is not intolerable provided it does not interfere to prevent substantial realization of objects of this invention. In some preferred embodiments, the non-maleic monomers are essentially devoid of pendant acid (e.g. carboxylic acid) or anhydride radicals. Thus in many embodiments the non-maleic monomers are desirably unsubstituted $C_1-C_{20}$ olefins (preferably $C_1-C_4$ such as ethylene or propylene), vinyl hydrocarbons such as styrene, vinyl lower ($C_1-C_4$) alkyl ethers, etc. Combinations of such non-maleic monomers may also be used in embodiments in which the copolymer is composed of at least two olefinically unsaturated monomers in addition to the maleic monomers.

As used herein, the term "maleic monomers" includes maleic anhydride and derivatives thereof which do not render the copolymer substantially soluble in the plasticizer used in this invention at a temperature below the melting point of that copolymer. Such derivatives include maleic acid and maleic acid esters (usually half esters) such as, e.g. methyl, ethyl, n-propyl, isopropyl, n-butyl, isobutyl and tert-butyl esters of maleic acid. In the copolymers used in this invention, there may be present one of such maleic monomers or, in combination, two or more of such monomers.

The invention can be carried out using any of various plasticizers in a plasticizing amount, i.e., an amount which provides satisfactory plasticization of the adhesive composition prior to its end use and adequate flexibility of that composition during such end use. In most embodiments the plasticizer employed is normally liquid (i.e., at room temperature) although other embodiments are satisfactorily carried out with plasticizers which melt above room temperature but substantially below the melting point of the copolymer used in this invention. In each of such embodiments the plasticizer is liquid at the stage of preparation of the compositions of this invention at which the copolymer becomes substantially soluble therein. These plasticizers are generally organic compounds and preferably oleophilic, i.e., having a solubility in water less than 5% and in most cases less than 1%, a hydrogen bonding index not greater than about ten and/or a solubility parameter not greater than about 14. Although many different kinds of such plasticizers are suitable, those preferably employed are esters, usually desirably containing at least two ester linkages per molecule. Commonly such plasticizers are selected from phosphates and polycarboxylates. For use in this invention, such esters are preferably aromatic compounds containing at least one, preferably from one to about three, and generally most advantageously two aryl radicals per molecule.

Polycarboxylate plasticizers useful in this invention include particularly dicarboxylates such as, e.g. phthalates, terephthalates, isophthalates, adipates, succinates, glutarates, sebacates, pimelates, azelates, etc. Preferred are alkyl aryl dicarboxylates, and particularly alkyl benzyl dicarboxylates, in which the alkyl radical contains up to about 20 and preferably from about 4 to about 12 carbon atoms, e.g. the branched and normal butyl, amyl, hexyl, heptyl, octyl, nonyl, decyl and undecyl benzyl phthalates, adipates, glutarates, succinates, etc. Most preferred are the phthalates, including dialkyl phthalates in which the average carbon atom content per alkyl radical is from about 6 to about 12, e.g. diheptyl, dinonyl, dioctyl or didecyl phthalate and, generally most advantageously, alkyl benzyl phthalates in which the alkyl radical contains from about 4 to about 12 carbon atoms, and variations thereof such as, e.g. 7-(2,6,6,8-tetramethyl-4-oxa-3-oxo-nonyl) benzyl phthalate. Butyl benzyl phthalate is most preferred in many embodiments.

The phosphate plasticizers which can be used include triaryl phosphates such as, e.g. isopropylphenyl diphenyl, t-butyl-phenyl diphenyl, tricresyl, cresyl diphenyl or triphenyl phosphate; alkyl diaryl phosphates such as, e.g. $C_9$-$C_{11}$ alkyl diphenyl, isodecyl diphenyl, 2-ethyl-hexyl diphenyl, isooctyl diphenyl, $C_7$-$C_9$ alkyl diphenyl or isononyl dicresyl phosphate; dialkyl aryl phosphates such as, e.g. diisodecyl phenyl, di-isododecyl t-butyl-phenyl or di-undecyl cresyl phosphate; trialkyl phosphates such as, e.g. tributyl, trioctyl or tri($C_7$, 9, 11 alkyl) phosphate; and variations thereof such as, e.g. tributoxyethyl phosphate. In such phosphates, alkyl radicals directly attached to the phosphate radical each contain preferably from about 4 to about 20, and generally even more desirably from about 8 to about 12 carbon atoms. Aryl groups directly attached to the phosphate radical may be unsubstituted or substituted, e.g. with one or more alkyl substituents each normally containing from 1 to about 8, and usually most desirably about 3 or 4 carbon atoms. Preferred among those phosphates are alkyl diaryl phosphates, particularly t-butylphenyl or isopropylphenyl diphenyl phosphate.

The plasticizing esters just described are believed to be essentially non-reactive in preparation of the adhesive compositions of this invention. However, reactive plasticizers may also be used. Suitable examples include various higher monoalcohols such as cetyl alcohol and monoalkyl hydroxy ethers (e.g. lower alkyl cellosolves) and, usually even more desirably, aryl sulfonamides such as, e.g. ortho- and para-toluenesulfonamides which may be desirably N-substituted with a lower alkyl group such as, e.g. ethyl. In fact, such sulfonamides and similarly reactive plasticizers are used in preferred embodiments of the invention in which they serve as at least a portion of the plasticizer as well as at least a portion of the compatibilizer reactive with the aforedescribed maleic copolymer, the plasticizer in such embodiments of the invention thereby comprising at least a portion of the compatibilizer in those embodiments.

An important component of this invention is the "compatibilizer" which reacts with at least a portion of the maleic monomers of the aforementioned copolymer to render it essentially completely soluble in an organic phase (typically the sole organic phase) of the adhesive composition of this invention and substantially soluble in the plasticizer component of that composition. The former solubilization converts the copolymer from a solid form to a dissolved constituent of a liquid adhesive and thus makes possible its utility for adhesive applications at temperatures below the melting point of the copolymer. Solubilization of the copolymer in the plasticizer may be essentially complete, e.g. in embodiments of the invention useful as hot melt adhesives, but in other embodiments the copolymer is usually desirably incompletely soluble in the plasticizer such that the resulting adhesive composition is an emulsion, i.e., a liquid mixture having more than one phase. Such emulsions are particularly attractive in various adhesive applications, and it is an important feature of this invention that adhesive emulsion compositions prepared as described herein are normally very stable, i.e. the phases of the emulsion resist separation on standing of the emulsion for extended periods of time, e.g. up to a week or even longer. This stability of the emulsion compositions of the invention means that such compositions are conveniently useful for many purposes in which they are not used immediately after mixing of their constituents. This feature contributes to a conveniently lengthy open time, i.e., the time after application of the adhesive to a substrate during which it essentially completely retains its adhesive character before contact with the surface to which that first substrate is to be adhered. On the other hand, it has been found that compositions of this invention also typically have or develop optimum tack within a convenient length of time after application to a substrate exposed to the atmosphere.

The compatibilizer used in this invention is selected from monofunctional compounds which react with the aforementioned copolymer at a temperature below the boiling point of the compatibilizer (preferably between about room temperature and about 100° C.) without resulting in substantial cross-linking of the copolymer. Various monofunctional compounds are useful for this purpose, but those usually most suitably employed are proton donors (compounds having a reactive hydrogen atom) such as water; alcohols such as, e.g. $C_1$-$C_6$ monoalkanols including ethanol, isopropanol and very desirably butanols such as isobutanol, cyclohexanol, diethyl ethanolamine, etc.; aldehydes such as, e.g. butyraldehydes; enolizable ketones such as, e.g. methyl ethyl ketone, acetyl acetone, diacetyl acetone and diacetone alcohol; mercaptans such as, e.g. butyl mercaptan; organic carbonates such as, e.g. ethylene or propylene carbonate; and organic bases including amides such as, e.g. dimethyl formamide, methyl butyramide and sulfonamides such as those described hereinbefore, and amines having at least one active hydrogen attached to the amine nitrogen, e.g. dibutyl amines and propyl amine. Mixtures of such compounds may be used and in fact, in embodiments employing water and/or an alcohol, it may be desirable or even necessary that there be present another compatibilizer compound (preferably an organic base) to bring about the required solubilities of the maleic copolymer in the compositions of this invention. Although the invention is not to be limited in accordance with any theory of its reaction mechanism, it is believed that compatibilizer compounds such as sulfonamides may react differently with maleic monomers of the copolymer depending on whether or not other monofunctional compounds such as, e.g. water, lower alkanols, etc. are present.

Although other proportions of the afore-described constituents are useful in many instances, the compositions of this invention are usually most satisfactorily prepared using from about 10 to about 30 parts of the copolymer, from about 20 to about 25 parts of the plasticizer and an amount of the compatibilizer sufficient to result in the desired solubilization of the copolymer without exceeding the desired level of its solubility in the plasticizer component. In even more preferred embodiments, from about 15 to about 25 parts of the copolymer are mixed with the proportions of plasticizer and compatibilizer just described. In many embodiments, the plasticizer preferably comprises at least about 10 parts ester of a kind described hereinbefore. When the plasticizer is at least partially of a reactive kind, e.g. an aryl sulfonamide, such a reactive plasticizer is desirably present in at least about 5 parts. In aqueous compositions, from about one to about 60 parts or more of water may be present, and for water-based adhesive compositions, the compatibilizer desirably contains at least about 1, and usually more preferably between about 20 and about 40 parts of water. When a lower alkanol or other alcohol is present, e.g. in a hot melt adhesive composition, it is preferably present in an amount between about 1 and about 5 parts. Although tack is generally enhanced by inclusion of plasticizer doubling as compatibilizer, the preferred proportion of reactive plasticizer may be limited in some instances by compatibility of the reacted copolymer with that plasticizer. When a mixture of essentially unreactive plasticizer (e.g. alkyl benzyl phthalate) and a reactive plasticizer (e.g. an aryl sulfonamide) is used, the ratio of the former to the latter usually should not substantially exceed about 1:1. On a calculated basis, it is preferred that excess mole equivalents of maleic acid and/or anhydride are present in most cases. Using more than about 0.2 (e.g. up to about 0.3) equivalents of such excess per 100 grams of copolymer, e.g. with more than about 50% copolymer in the mixture, typically provides compositions which are normally solid but which melt at temperatures close enough to room temperature that they can be suitably used in hot melt adhesives. Smaller amounts of excess acid (less than about 0.2, e.g. from about 0.15 to about 0.2 equivalents per 100 grams of copolymer) normally provide adhesive compositions which are stable and suitably flowing (non-solid) at room temperature.

In other embodiments, copolymer blends may be advantageously used. For example, blends of an ethylene maleic anhydride copolymer with a styrene maleic anhydride copolymer normally provide greater compatibility with the plasticizer than the ethylene maleic anhydride copolymer alone and, in some instances, require less plasticizer than the styrene maleic anhydride copolymer alone. Generally, large amounts of alcohol tend to decrease compatibility of the composition and result in a harder adhesive when cured, whereas large amounts of amide tend to favor a softer cured adhesive. Aqueous compositions typically provide good bonding to organic materials, e.g. cellulosics such as Masonite, wood, paper, cotton fabrics, etc. With reference to aqueous compositions containing from about 10 to about 30 parts copolymer, those containing less than about 20 parts water are normally of a gel variety, those containing from about 20 to about 40 parts water flow more readily, and those containing more than about 40 parts water are normally pourable or gunnable. Also generally, the compositions of this invention containing a mixture of reactive and essentially non-reactive plasticizers, e.g. an aryl sulfonamide and an alkyl benzyl phthalate, are good hot melt adhesives which provide strong bonds to glass. In such compositions, larger amounts of alcohol usually provide a harder cured adhesive, while larger amounts of amide promote tackiness which makes those compositions suitable as pressure sensitive adhesives.

Mixing of the compositions herein may be by any suitable means including, e.g. Waring blender, air mixer, Cowles dissolver, Myers mixer, etc. The mixing is normally carried out at temperatures substantially below the melting point or range of the copolymer, and usually between room temperature and about 150° C. In general, the mixing is satisfactorily carried out between room temperature and 99° C. for water-based compositions. Temperatures from about 50° to about 150° C. and preferably from about 60° to about 130° C. are typically used for essentially non-aqueous embodiments of the invention, e.g. those useful as hot melt adhesives. Generally reaction of the compatibilizer and copolymer is essentially complete at the mixing temperature although if desired, the temperature can be raised following mixing to complete the reaction. Normally mixing times are between about 30 seconds and about two hours, although shorter or longer times may be satisfactory in some embodiments. In a preferred embodiment of the invention in which most or all of the compatibilizer (e.g. an enolizable ketone) is thoroughly mixed with the plasticizer before the copolymer is combined therewith, compositions (commonly gel-like) having superior adhesive qualities and internal (cohesive) strength are produced.

Various other conventional adhesive additives may be advantageously included in the compositions of this invention. For example, oxides of multivalent metals such as, e.g. iron, zinc, aluminum, tin and particularly antimony provide the cured adhesive with greater adhesion and water resistance. Conventional colorants, fillers, diluents, and various other constituents may also be included, although the plasticizer and reacted copolymer make up normally at least about 20%, and preferably at least about 50% of an adhesive composition of this invention. With the inclusion of carbonates of one or more polyvalent metals, e.g. magnesium, calcium, barium, iron or tin (preferably in an amount from about 10 to about 40 parts based on the combined amount of plasticizer and reacted copolymer) very strong, shock absorbing, gel-like compositions are typically obtained.

The following specific examples are for purposes of illustration only and do not imply any limitation on the scope of the invention. In these examples, the following adhesive composition constituents are used:

Copolymer A—A finely divided, particulate 1:1 mole ratio copolymer of styrene and maleic monomers (0.42 anhydride, 0.064 acid and 0.064 methyl half ester equivalents per 100 g copolymer) having a number average MW of 50,000 (90% having a major particle diameter smaller than 25 microns).

Copolymer B—A finely divided, particulate 1:1 mole ratio copolymer of ethylene and maleic anhydride (0.794 anhydride equivalents per 100 g copolymer) having a number average MW of 31,000 (90% having a major particle diameter smaller than 25 microns).

Plasticizer A—Butyl benzyl phthalate.

Plasticizer B (reactive)—Mixture of N-ethyl-o- and p-toluenesulfonamides.

$Fe_2O_3$—Finely divided filler/cross-linker (90% having a major particle diameter smaller than 10 microns).

EXAMPLES 1–15

Copolymers A and B, Plasticizers A and B, water, isobutanol and $Fe_2O_3$ are mixed in a 400 ml glass beaker in the proportions shown in Table I. Mixing is begun at room temperature and continued for 90 minutes, except for Examples 12–15 in which it is begun at 65° C. and continued for 1 hour. In each example, the resulting wet composition has good, stable compatibility of constituents. Within 72 hours after mixing, the composition of each example is spread 1 mm thick on the rough side of a 5 cm long end portion of a 2.5 cm wide strip of 0.63 cm thick Masonite and then compressed with 0.2 kg/cm² force for 2 minutes at room temperature between that end portion and the rough side of a 5 cm long end portion of a parallel identical strip of Masonite. After allowing 24–72 hours more for curing of the adhesives, lap shear strengths are determined on an Instron device in accordance with ASTM Test Procedure D-1002. In the case of Examples 12–15, duplicate determinations are run with fresh adhesive applied at a temperature between 120° and 130° C., and with adhesive aged one week at 120° C. and then similarly applied. In Examples 12–15, all cured compositions are rubbery and thermoplastic, while those in Examples 8–11 dry hard. Results of the lap shear tests are in Table I. In Examples 1–11, however, the adhesive bonds did not rupture and accordingly, the lap shear results represent breaking strengths of one of the two bonded Masonite strips rather than the ultimate bond strengths which are of greater magnitudes not precisely determined. In addition, the compositions prepared in Examples 12–15 exhibit high adhesion to glass.

COMPARATIVE EXAMPLES A–D

When the procedure of Examples 1–11 is duplicated except for substitution of commercially available contact adhesives for the compositions of this invention, the following lap shear strengths result:

| Adhesive | Kg. |
|---|---|
| Weldwood (Water Based Neoprene Latex - sold by Roberts Consolidated Co.) | 96 |
| Duro Contact (Water Based Chloroprene Latex - sold by Woodhill-Permatex Co.) | 111 |
| Scotch (Water Based Neoprene and/or Natural Rubber Latex - sold by 3M Company) | 148 |
| Liquid Nails (Neoprene in Solvent - sold by Macco Adhesives Co.) | 73 |

As shown, the water based compositions of this invention provide lap shear bond strengths greater than those of each of the commercially available adhesives and, in most cases, at least one third greater than even the greatest bond strength provided by any of the commercially available adhesives. Hot melt embodiments of the invention (see Examples 12–31) provide commercially attractive bond strengths which are in some cases, although substantially lower than those of their water based counterparts as would be expected, surprisingly comparable to the bond strengths provided by the commercially available contact adhesives. The adhesive compositions of this invention also typically provide attractive open times under normal conditions (humidity, etc.) up to two or even three hours, while the open times of the aforementioned contact adhesives are shorter than one hour and in some cases one-half hour.

EXAMPLES 16–31

In these examples of non-aqueous compositions of the invention, Copolymer A is stirred for one hour at 70° C. with a solution previously prepared by mixing an enolizable ketone with Plasticizer A and/or B. The proportions of each are shown in Table II. Lap shear strengths of these compositions at different open times before bonding are determined by the procedure of Examples 12–15 using adhesive aged one week at 70° C. Results are in Table II, where a single asterisk represents that the adhesive bond did not rupture (same significance as in Examples 1–11).

TABLE I

| Example | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|
| Copolymer A, parts | — | — | — | — | — | — | — | 15 | → | → | → | 20.2 | → | 10.1 | → |
| Copolymer B, parts | 25 | → | → | → | → | → | → | 12.5 | → | → | → | — | — | 6.3 | → |
| Plasticizer A, parts | 25 | → | → | → | → | → | 50 | 25 | → | → | → | 20 | → | → | → |
| Plasticizer B, parts | — | 5 | 10 | 15 | 20 | 25 | 25 | — | 5 | 10 | 15 | 12.3 | 17.7 | → | 15 |
| Water, parts | 66 | → | → | → | → | → | 150 | 66 | → | → | → | — | 8* | — | — |
| Isobutanol, parts | — | — | — | — | — | — | 5 | → | → | → | → | 3 | 1 | → | 2 |
| Lap shear strengths, kg (Fresh) | 220 | 170 | 197 | 227 | 197 | 227 | 204 | 204 | 161 | 215 | 165 | 93 | 102 | 24 | 29 |
| Lap shear strengths, kg (Aged) | | | | | | | | | | | | 47 | 36 | 29 | 20 |

*($Fe_2O_3$)

TABLE II

| Example | 16 | 17 | 18 | 19 | 20 | 21 | 22 | 23 | 24 | 25 | 26 | 27 | 28 | 29 | 30 | 31 |
|---|---|---|---|---|---|---|---|---|---|---|---|---|---|---|---|---|
| Copolymer A, parts | 40 | → | → | 30 | 20 | 10 | 40 | → | → | 30 | 20 | 10 | → | 40 | → | → |
| Plasticizer A, parts | 50 | 40 | → | → | → | → | 50 | 40 | → | → | → | → | → | → | 90 | — |

TABLE II-continued

| Example | 16 | 17 | 18 | 19 | 20 | 21 | 22 | 23 | 24 | 25 | 26 | 27 | 28 | 29 | 30 | 31 |
|---|---|---|---|---|---|---|---|---|---|---|---|---|---|---|---|---|
| Plasticizer B, parts | 30 | 40 | 50 | → | → | → | 30 | 40 | 50 | → | → | → | → | → | — | |
| Acetyl acetone, parts | 20 | → | → | → | 14 | 7 | — | — | — | — | — | — | — | 20 | → | → |
| Diacetone alcohol, parts | — | — | — | — | — | — | 20 | → | → | → | 14 | 7 | → | 50** | — | — |
| Lap shear strengths, Open time, hrs. | | | | | | | | | | | | | | | | |
| 0 | 9 | 16 | >45 | 10 | 14 | 3 | 37 | 45 | 40 | 45 | 29 | 8 | 6 | >45 | 6 | 33 |
| 1 | 5 | 10 | 6* | 15 | 8 | 2 | 12 | 17 | 20 | 13* | 8 | 8 | 4 | — | — | — |
| 2 | 5 | 6* | 13 | 10 | 2* | 2 | 8 | 9* | 7* | 15* | 8 | 1 | 3 | — | — | — |
| 3 | 6 | 15 | 7* | 9 | 9 | 1 | — | 12 | 10 | 7 | — | 3 | 4 | — | — | — |

**Talc (filler)

We claim:

1. An essentially non-aqueous composition prepared by mixing (A) organic plasticizer selected from polycarboxylates, (B) normally-solid copolymer of olefinically unsaturated monomers of which a subtantial proportion are maleic monomers selected from maleic anhydride, derivatives thereof which do not render said copolymer substantially soluble in said plasticizer below the melting point of said copolymer, and combinations thereof and (C) compatibilizer selected from monofunctional amides which react with at least a portion of said maleic monomers to render said copolymer essentially completely soluble in said composition and substantially soluble in said plasticizer at a temperature below the melting point of said copolymer.

2. A composition of claim 1, said plasticizer being oleophilic.

3. A composition of claim 1 wherein from about 20 to about 25 parts by weight of said plasticizer are mixed with from about 10 to about 30 parts by weight of said copolymer.

4. A composition of claim 1, said plasticizer being predominantly $C_4$-$C_{12}$ alkyl benzyl phthalate.

5. A composition of claim 1, said compatibilizer being predominantly aryl sulfonamide.

6. A composition of claim 1 wherein the remainder of said unsaturated monomers are selected from ethylene, styrene, vinyl lower alkyl ethers and combinations thereof.

7. A composition of claim 1 wherein said maleic monomers constitute between about 25% and about 75% by weight of said unsaturated monomers.

8. A composition of claim 1 wherein said plasticizer is liquid at room temperature.

9. A composition prepared by mixing (A) from about 20 to about 25 parts by weight of plasticizer selected from polycarboxylates, (B) from about 10 to about 30 parts by weight of normally-solid copolymer of olefinically unsaturated monomers of which a substantial proportion are maleic monomers selected from maleic anhydride, derivatives thereof which do not render said copolymer substantially soluble in said plasticizer below the melting point of said copolymer, and combinations thereof and (C) compatibilizer selected from monofunctional amides which react with at least a portion of said maleic monomers to render said copolymer essentially completely soluble in an organic phase of said composition and substantially soluble in said plasticizer at a temperature below the melting point of said copolymer.

10. A composition of claim 9, said plasticizer being predominantly $C_4$-$C_{12}$ alkyl benzyl phthalate.

11. A composition of claim 9, said compatibilizer being predominantly aryl sulfonamide.

12. A composition of claim 9 wherein the remainder of said unsaturated monomers are selected from ethylene, styrene, vinyl lower alkyl ethers and combinations thereof.

13. A composition of claim 9 wherein said maleic monomers constitute between about 25% and about 75% by weight of said unsaturated monomers.

14. A composition of claim 9 wherein said plasticizer is liquid at room temperature.

15. A composition prepared by mixing (A) organic plasticizer selected from polycarboxylates, (B) normally-solid copolymer of olefinically unsaturated monomers of which a substantial proportion are maleic monomers selected from maleic anhydride, derivatives thereof which do not render said copolymer substantially soluble in said plasticizer below the melting point of said copolymer, and combinations thereof and (C) compatibilizer selected from monofunctional amides which react with at least a portion of said maleic monomers to render said copolymer essentially completely soluble in an organic phase of said composition and substantially soluble in said plasticizer at a temperature below the melting point of said copolymer, said maleic monomers comprising a reactive excess of maleic acid and/or anhydride with respect to said compatibilizer.

16. A composition of claim 15, said plasticizer being predominantly $C_4$-$C_{12}$ alkyl benzyl phthalate.

17. A composition of claim 15, said compatibilizer being predominantly aryl sulfonamide.

18. A composition of claim 15 wherein the remainder of said unsaturated monomers are selected from ethylene, styrene, vinyl lower alkyl ethers and combinations thereof.

19. A composition of claim 15 wherein said maleic monomers constitute between about 25% and about 75% by weight of said unsaturated monomers.

20. A composition of claim 15 wherein said plasticizer is liquid at room temperature.

21. A composition of claim 15 wherein said excess is between about 0.15 and about 0.3 equivalents per 100 grams of said copolymer.

* * * * *